United States Patent [19]
Nishida

[11] Patent Number: 5,349,415
[45] Date of Patent: Sep. 20, 1994

[54] PHOTOGRAPHIC OPTICAL SYSTEM CONTROLLING APPARATUS

[75] Inventor: Yoshihiro Nishida; Nagaokakyo, Japan

[73] Assignee: Mitsubishi Denki Kabushiki Kaisha, Tokyo, Japan

[21] Appl. No.: 969,577

[22] Filed: Oct. 30, 1992

Related U.S. Application Data

[62] Division of Ser. No. 686,354, Apr. 17, 1991, Pat. No. 5,210,566.

[30] Foreign Application Priority Data

Apr. 19, 1990 [JP] Japan ................................ 2-103607
Nov. 1, 1990 [JP] Japan ................................ 2-296391

[51] Int. Cl.$^5$ .......................... G03B 7/08; G03B 17/18
[52] U.S. Cl. .................................. 354/432; 354/466; 354/41.2
[58] Field of Search ............... 354/421, 432, 466, 471, 354/410, 412

[56] References Cited

U.S. PATENT DOCUMENTS

| | | | |
|---|---|---|---|
| 4,320,948 | 3/1982 | Hosoe et al. | 354/432 X |
| 4,774,401 | 9/1988 | Yamada et al. | 354/432 X |
| 5,003,339 | 3/1991 | Kikuchi et al. | 354/402 |
| 5,019,854 | 5/1991 | Mukai et al. | 354/471 |
| 5,031,049 | 7/1991 | Toyama et al. | 354/402 X |
| 5,210,566 | 5/1993 | Nishida | 354/402 |

Primary Examiner—Michael L. Gellner
Assistant Examiner—Jae N. Noh

[57] ABSTRACT

A photographic optical system controlling apparatus for carrying out an automatic focusing control and an exposure control. The apparatus comprises a motion vector detecting means for detecting the motion of the image and changes a gate area or a photometric area. The result is that the focusing or the exposure controlling operation can be carried out accurately following the motion of a main object, irrespective of the positional change of the object the screen.

39 Claims, 15 Drawing Sheets

Fig.11(a)
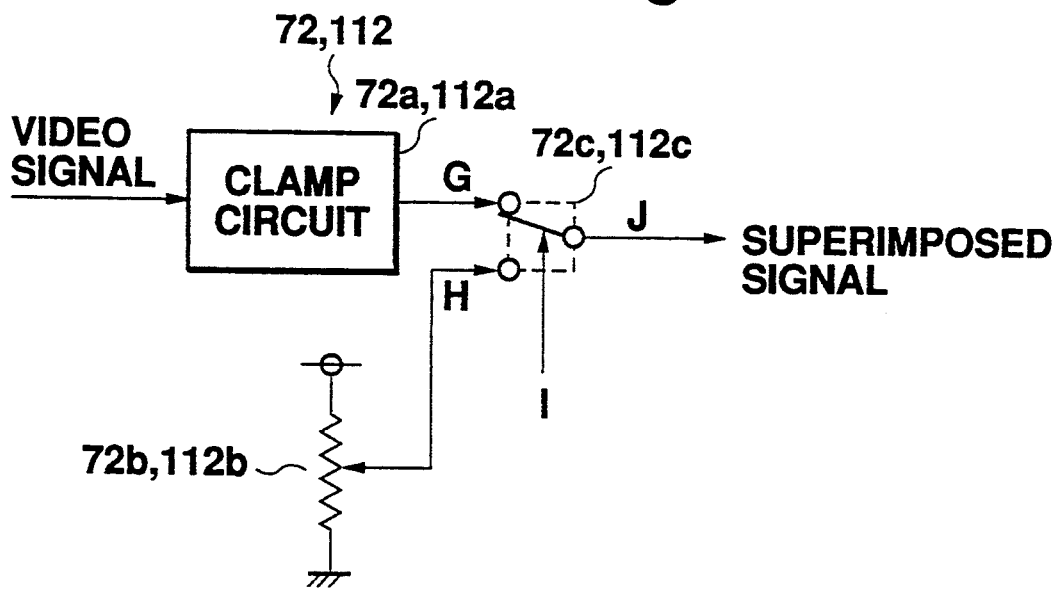
Fig.11(b)
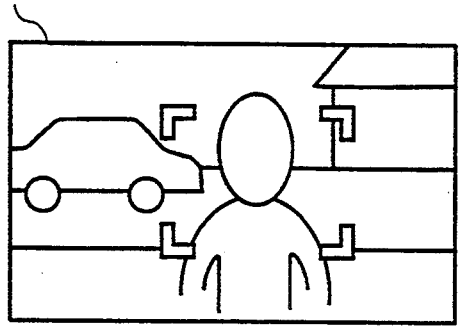
Fig.11(c)

PHOTOGRAPHIC OPTICAL SYSTEM CONTROLLING APPARATUS

This application is a divisional of copending application Ser. No. 07/686,354, filed on Apr. 17, 1991, U.S. Pat. No. 5,210,566. The entire contents of which are hereby incorporated by reference.

BACKGROUND OF THE INVENTION

1. Field of the Invention

This invention relates to a photographic optical system controlling apparatus used in video cameras etc., which performs lens focusing control and exposure control based on image signals obtained from an imaging element.

2. Description of the Related Art

Heretofore, there have been proposed various types of automatic focusing system used as an optical controlling means of a photographic apparatus. Among them, the most popular method, using an image signal obtained from an imaging means, is to pick up the high-frequency component in the image signal and to obtain its differential value, and then to drive a lens in a direction which allows the absolute value of the differential value to be increased. An object image obtained through the lens system is most sharply outlined when in focus. Further and being out of focus in any direction causes fuzz. Therefore, the output image signal of the video camera used to photograph this object image has a maximum level of its high-frequency component when in focus.

The image can then be brought into focus by controlling the position of the lens such that the high-frequency component of the image signal becomes maximum. Such a focusing method is called the "climbing serbo method".

FIG. 12 of the accompanying drawings shows a typical automatic focusing apparatus using the climbing serbo method. In FIG. 12, the numerals designate respectively: 2, a lens; 4, an imaging element for converting the image, formed on the imaging surface through the lens, into electrical signals; 6, a pre-amplifier for amplifying the image signal output from the imaging element 4; 8, signal processing circuit for converting the output signal from the pre-amplifier 6 into a standardized signal like an NTSC signal; 10, a band-pass-filter (hereinafter referred as "BPF") for picking up only the high-frequency component of the output signal from the pre-amplifier 6; 12, a gate circuit for selecting only the signal in the focusing detecting area from the output signals of the BPF 10 forming one screen (one field or one frame), and allowing the selected signal to pass through; 14, wave-detecting circuit for wave-detecting the output of the gate circuit 12; 16, motor driving circuit for driving the lens driving motor based on the output of the wave-detecting circuit 14; and 18, a lens driving motor for controlling the focusing operation by moving the lens position.

According to this composition, the image formed on the imaging surface of the imaging element through the lens 2 is converted into electrical signals, and is then amplified to a predetermined level by the pre-amplifier 6. The high-frequency component of the image signal varies in accordance with the lens position, namely the focusing condition of the object. Specifically, the high-frequency component increases as the lens moves closer to the in focus position, and becomes maximum at the focus point.

FIG. 13 shows the variation of the high-frequency component in the image sigal with respect to the lens position. As seen from the FIG. 13, the high-frequency component becomes maximum at the focus point, and decreases as the lens moves away from the focus point. Accordingly, it is understood that the focused state can be obtained by positioning the lens at a position rendering the maximum high-frequency component.

As another optical system controlling device of a photographic apparatus, an exposure controlling device is known. The main section of such a photographic apparatus is shown in FIG. 14.

In FIG. 14, the numerals designate respectively: 20, a lens; 22, an exposure controlling circuit for controlling the quantity of light incident from the lens 20; 24, an imaging element for converting the image formed on the imaging surface through the lens 20 into an electrical signal; 26, an amplifier for amplifying the image signal output from the imaging element 24; 28, an AGC circuit for ensuring that the output signal from the amplifier 26 is constant; 30, a signal processing circuit for converting the output from the AGC circuit into a standardized (e.g. NTSC) image signal; 32, an image signal output from the signal processing circuit 30; 34, a photometric area determining circuit for determining the photometric area; 36, a gate circuit for allowing the output signal of the amplifier 26 to pass through in accordance with the timing of the photometric area, being the output of the photometric area determining circuit 34; 38, a signal level detecting circuit for detecting the luminocity information output from the gate circuit 36; 40, an exposure detecting signal generated in the signal level detecting circuit 38; and 42, an exposure control target value set by an external device.

In operation of the apparatus shown in FIG. 14, the incident light, projecting into the lens 20 and exposure-controlled by the exposure controlling circuit 22, forms an image on the imaging element and is converted into electrical signals. The output of the imaging element 24 is amplified in the amplifier 26 and input to a AGC circuit 28. The AGC circuit 28 controls the gain of the signal to make its output level constant, which is output as an image signal 32 through a signal processing circuit 30. Meanwhile, a photometric area determining circuit 34 outputs signals corresponding to the timing of a photometric frame. The output of the amplifier 26 is input to the signal level detecting circuit 38 through a gate circuit 36 in accordance with the timing. The signal level detecting circuit 38 generates an exposure detecting signal, being information of light intensity. The exposure controlling circuit 22 controls the exposure such that the level of the exposure detecting signal 40 equals an exposure control target value 42.

Next, an emphasized photometric operation provided with a photometric frame will be described hereinafter. In general, the upper part of the background of an image usually consists of a high luminace image like the sky. Therefore, if the exposure controlling is performed in accordance with the luminance level of such a high-luminance background, the image will become a so-called backlight shot causing the main object e.g. face of a person, to become darkened. To cope with this problem, there has been performed exposure control by providing a photometric frame 44 positioned at the lower central part of the screen by a photometric area generating circuit 34, and then by performing an emphasized photometric operation in the photometric frame using image signals in the frame by a signal level detecting circuit 38, as shown in FIG. 15(a). Alternatively, another type of exposure controlling operation may be carried out by dividing the screen into a plurality of portions, and weighting the luminance information obtained from each of the divided portions, as shown in FIG. 15(b).

According to the aforementioned conventional automatic focusing device, however, a disadvantage has arisen: the focusing detecting area is fixedly determined at the center of the screen, so there has been a fear of misfocusing on other objects, which should not be focused on, and are accidentally located at the center of the screen, when the position of the object to be focused and having been at the center changes owing to the movement of the camera etc. In order to avoid such an inconvenience, Japanese Patent Laid-Open No. Sho 64-49484 or Japanese Patent Laid-Open No. Sho 64-71382 teaches the use of a variable gate circuit. However, since the area determinating operation by the variable gate circuit is carried out basically by the same method as the focusing state detecting method, if the focusing operation malfunctions, the gate area determination operation will suffer degradation in accordance therewith.

Also, according to the aforementioned conventional exposure controlling device, a disadvantage has arisen: the emphasized photometric area is fixedly determined in the screen irrespective of the weighting value. Therefore, even if the position of the main object in the screen changes due to the movement of the camera etc., the exposure control operation is carried out to be optimum for any object located in the photometric area, not for the main object.

SUMMARY OF THE INVENTION

It is therefore an object of this invention to provide a photographic optical system controlling apparatus comprising an automatic focusing device capable of: continuously focusing on the main object irrespective of its positional change in the screen; designating the gate area; identifying the gate area so as to easily correct and change the input operation of the main object; and accurately detecting the movement of the main object.

Also, it is another object of this invention to provide a photographic optical system controlling apparatus comprising an exposure controlling device capable of: controlling the exposure for the main object to be optimum irrespective of the positional change of the main object in the screen; designating the photometric area; identifying the gate area so as to easily correct and change the input operation of the main object; and accurately detecting the movement of the main object.

According to this invention, a photographic optical system controlling apparatus for automatically controlling the focusing operation of a photographic optical system based on an image signal obtained In a focusing detecting area designated on a photographic screen, said apparatus comprising: a motion vector detecting means for detecting the motion of an image from the correlation of two time-continuous image data; and a gate area controlling means which detects the main object from the output of said motion vector detecting means, and controls a gate area to follow to the motion of the main object.

The motion vector detecting means detects the motion of the image (direction and magnitude) and changes the gate area in accordance therewith.

Further, according to this invention, a photographic optical controlling apparatus for controlling exposure based on an image signal obtained at a photometric area designated on a photographic screen, said apparatus comprising: a motion vector detecting means for detecting the motion of an image from the correlation of two time continuous image data; and a photometric area controlling means which detects the motion of the main object from the output of said motion vector detecting means, and causes the photometric area to follow the motion of the main object.

The motion vector detecting means detects the motion of the image (direction and magnitude) and changes the photometric area by in accordance therewith.

The above and other advantages, features and additional objects of this invention will be manifest to those versed in the art upon making reference to the following detailed description and the accompanying drawings in which a preferred structural embodiment incorporating the principles of this invention is shown by way of an illustrative example.

BRIEF DESCRIPTION OF THE DRAWINGS

FIGS. 11(a)-11(c) are schematic views showing the composition and the operation of the gate area superimposing circuit;

DETAILED DESCRIPTION

The principles of this invention are particularly useful when embodied in an automatic focusing device and in an exposure controlling device used in a photographic camera etc.

Figure 1:
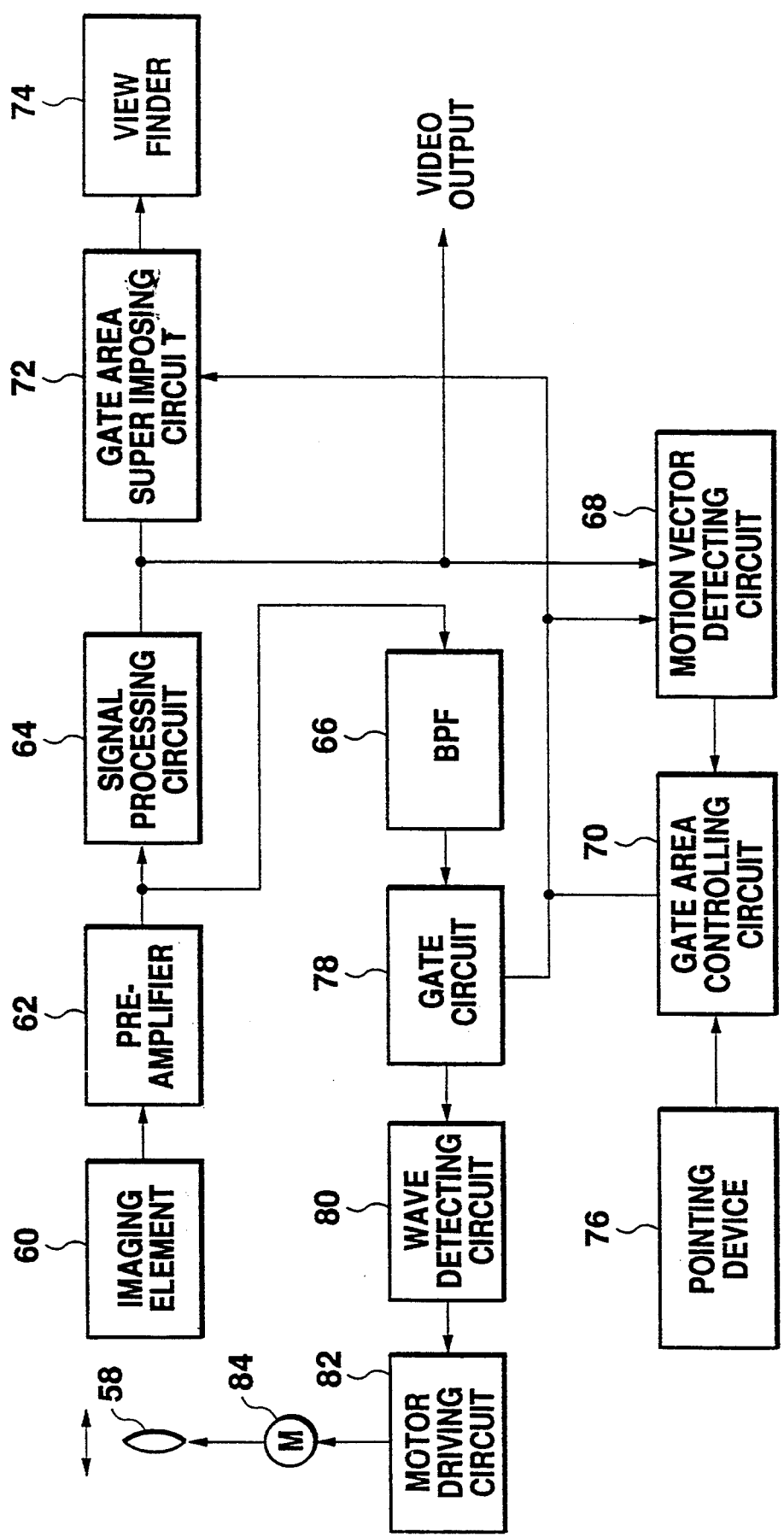
FIG. 1 is a block diagram showing an embodiment of an automatic focusing device according to this invention.

FIG. 1 is a block diagram showing an automatic focusing device according to this invention. In FIG. 1, the numerals respectively designate: 58, a lens; 60, an imaging element for converting the image formed on the imaging surface through the lens 58 into an electrical signal; 62, a pre-amplifier for amplifying the image signal output from the imaging element 60; 64, a processing circuit for converting the output from the pre-amplifier 62 into a standardized (e.g. NTSC) image signal; 66, a BPF (band-pass filter) for extracting the high-frequency component from the output signal of the pre-amplifier 62; 68, a motion vector detecting circuit for detecting the motion of the image from two time continuous image frames; 70, a gate area controlling circuit for changing the gate area in accordance with the output of the motion vector detecting circuit; 72, a gate area superimposing circuit for superimposing the gate area on the video signal; 74, a view finder for watching the image with the gate area superimposed thereon; 76, a pointing device for inputting the corrections or changes of the gate area to the gate area controlling circuit 70 thereby constituting a gate area designating device; 78, a gate circuit for selecting only the signal at the focusing detecting area from the signals corresponding to the one screen (or one field or one frame) and for allowing the selected signals to pass therethrough; 80, a wave-detecting circuit for wave-detecting the output of the gate circuit 78; 82, a motor driving circuit for driving a lens driving motor; 84, a lens driving motor for moving the lens position to control the focusing.

Similar to the aforementioned conventional device, the image formed on the imaging surface of the imaging element by the lens 58 is: converted into electrical signals; amplified to a predetermined level by the pre-amplifier 62; converted into a video signal by the processing circuit 64. Also, the lens is stopped at a position where the maximum high-frequency component of the video signal is achieved, thereby providing the desired focused state.

The characteristics of this invention are the ability to detect the motion of the main object and to move the gate area in accordance therewith. Namely, an automatic focusing operation is carried out which follows the movement of the main object.

In order to enhance the operation of the automatic focusing device, there are also provided a pointing device 76 for inputting gate area-corrections or changes by the user, and a gate area superimposing circuit 72 for superimposing the gate area on the video signal to allow the user to visually recognize the gate area on the screen.

Figure 2:
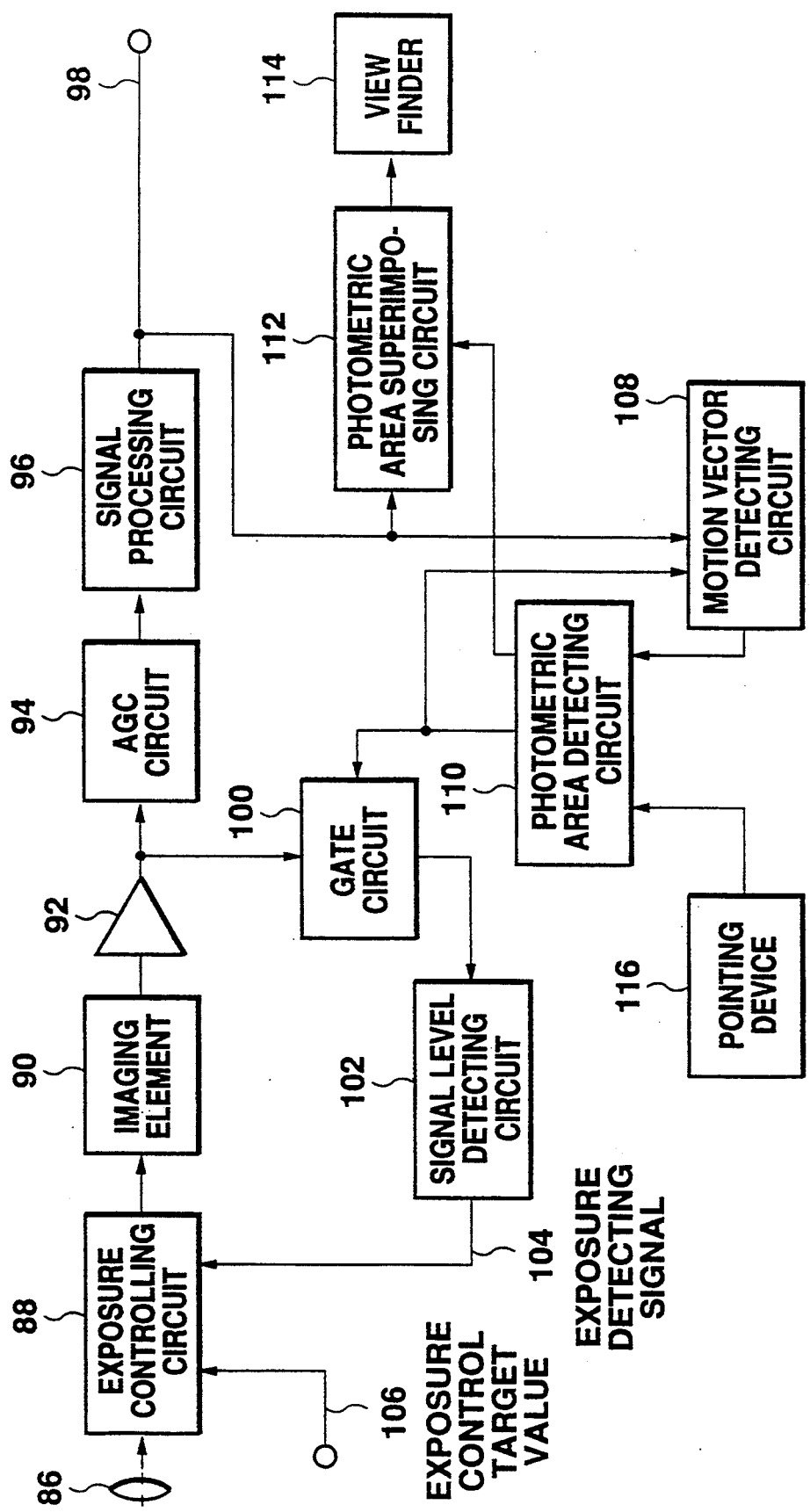
FIG. 2 is a block diagram showing an embodiment of an exposure controlling device according to this invention.

FIG. 2 is a block diagram showing an exposure controlling device according to this invention. In FIG. 2, the numerals designate respectively: 86, a lens; 88, an exposure controlling device for controlling the amount of incident light which passes through the lens 86; 90, an imaging element for converting the image formed on the imaging surface by the lens 86 into electrical signals; 92, an amplifier for amplifying the image signal output from the imaging element 90; 94, an ACG circuit for controlling the gain the amplifier 92 so that the output will be a predetermined level; 96, a signal processing circuit for converting the output signal from the AGC circuit 94 into a standardized signal like NTSC; 98, an image signal output from the signal processing circuit 96; 100, a gate circuit for allowing only the output signals corresponding to the photometric area from the amplifier 92; 102, a signal level detecting circuit for detecting the brightness information of the output signal from the gate circuit 100; 104, an exposure detecting signal generated in the signal level detecting circuit 102; 106, an exposure controlling target value which is set by an external apparatus; 108, a motion vector detecting circuit for detecting the motion of the image from two time continuous screens; 110, a photometric area controlling circuit for changing the photometric area in accordance with the output of the motion vector detecting circuit 108; 112, a photometric area superimposing circuit for superimposing the photometric area on the video signal for display; 114, a view finder for visually recognizing the image on which the photometric area is superimposed; 116, a pointing device for inputting the correction and change of the photometric area to the photometric area controlling circuit 110.

In operation, the incident light through the lens 86 is exposure-controlled by the exposure controlling circuit 88, and thereafter converted into electrical signals and amplified by the amplifier 92. The output level of the amplified signal is kept constant by the AGC circuit 94, and is transmitted as an image signal 98 through the signal processing circuit 96. The output of the amplifier 92 is input to the signal level detecting circuit 102. The exposure controlling circuit 88 controls the exposure such that the level of the exposure detecting signal 104 equals the exposure controlling target value 106.

The characteristics of this invention are the ability to detect the motion of the main object by the motion vector detecting circuit 108 and to move the photometric area following the movement of the main object by the photometric area controlling circuit 110. Namely, the exposure is controlled in accordance with the motion of the main object. Further, the pointing device 116 is provided to allow the user to input the correction and change of the photometric area, and the photometric area superimposing circuit 112 is provided for superimposing the gate area on the video signal to allow the user to visually recognize the photometric area.

The motion vector detecting circuit 68, 108 will now be explained referring to the FIGS. 3 and 4.

In order to detect the amount of movement the image between a pair of frames, it is ideal to compute what amount the image has moved by in which direction, for all the pixels in the image, which renders the best detecting accuracy of the motion vector. However, this naturally requires enormous hardware and performance time and is not easily realized. In general, therefore, only a part of all the pixels (hereinafter referred as representative pixels) have been used to determine the motion vector of the entire screen.

Figure 3:
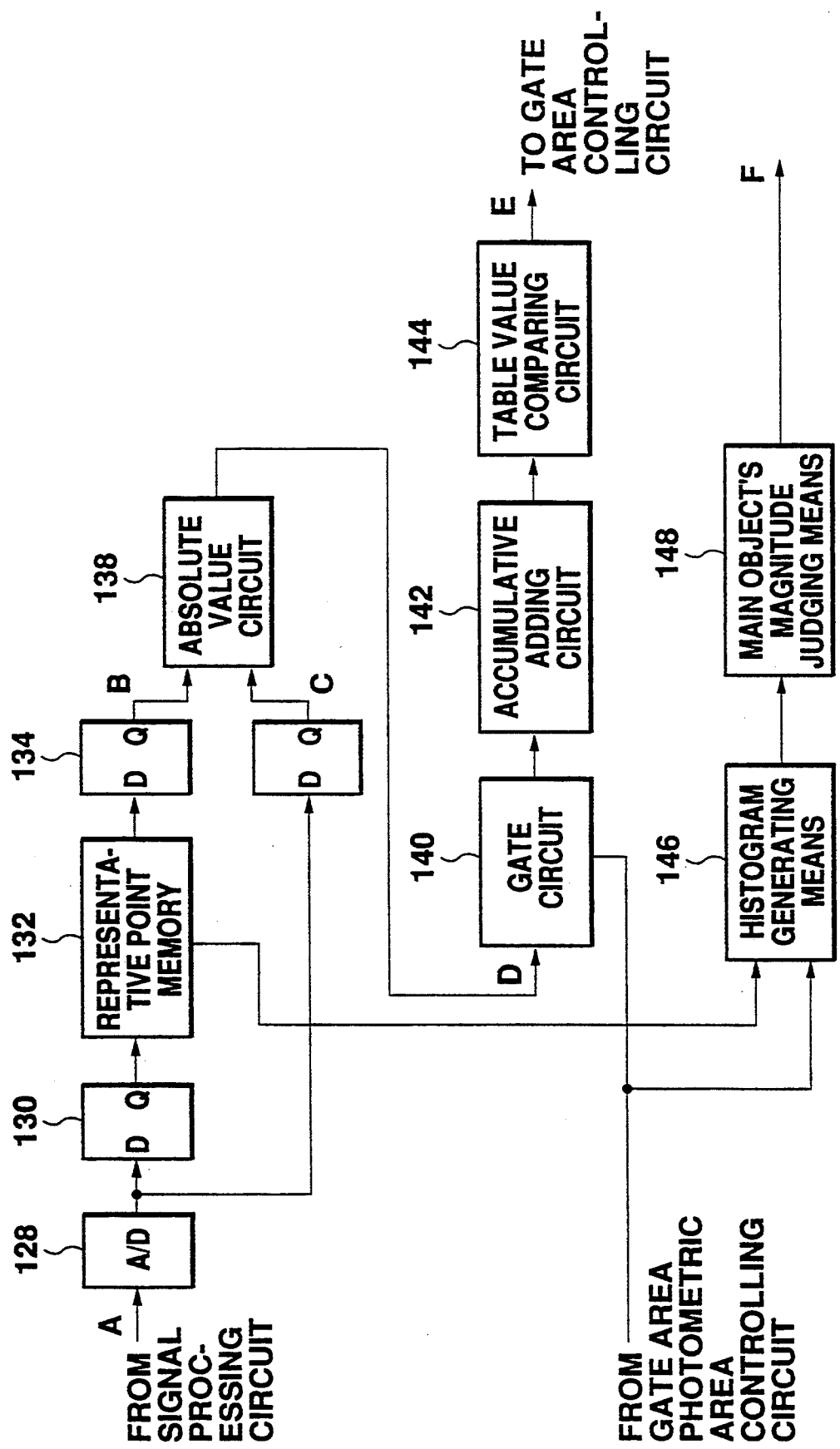
FIG. 3 is a block diagram showing an example of the motion vector detecting circuit in FIGS. 1 and 2.
Figure 4:
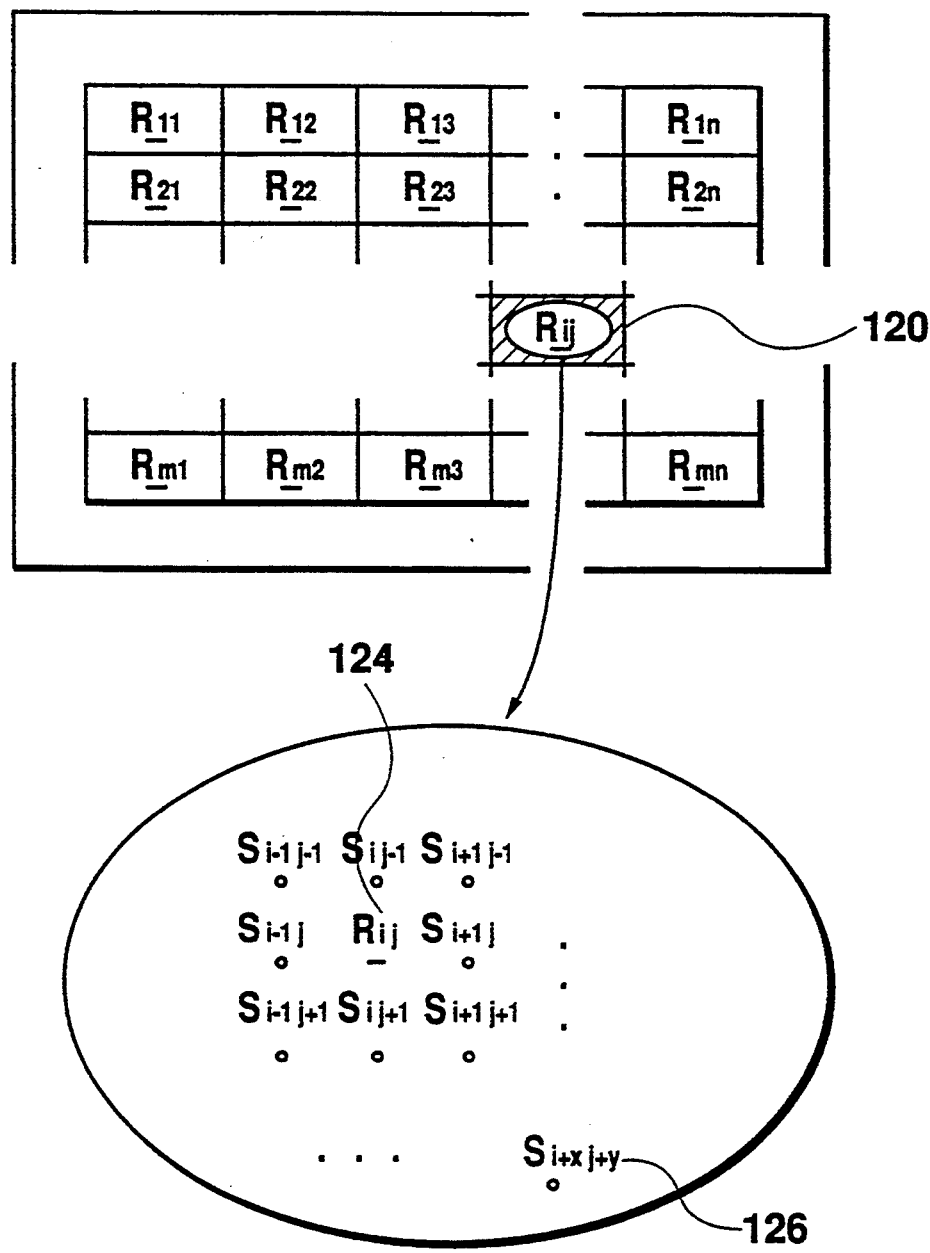
FIG. 4 is a schematic view showing the relationship between the block and a typical point in the motion vector detecting circuit.

FIG. 3 is a block diagram showing a well-known representative pixel calculating circuit. FIG. 4 represents the relationship between the block of the image in the conventional device in FIG. 2 and the representative points. A one-field image is divided into a predetermined number of blocks 120, each of which is provided with a representative point $R_{ij}$ 124 at the center thereof. In each block, the level difference is taken between the representative point in the block just before, and all the pixels $S_{i+x\ j+y}$ 126 in the subject block.

In FIG. 3, an input image signal A is initially converted in the A/D converter 128 to a digital signal. A predetermined pixel in the block 120 to be the representative point is written in the representative memory 132 through the latch circuit 136. The data stored in the representative memory 132 is read out with a delay of one frame, and then transmitted to the absolute value circuit 138 through the latch circuit 134. On the other hand, the A/D converted image signal data is transmitted to the absolute value circuit 138 through the latch circuit 136. The representative point signal (B) and the pixel signal (C) of the present frame output from the latch circuit 136 are input for calculation in the absolute value circuit 138 to render an absolute value of difference. Such a calculation is carried out for each block. This output signal (D) of the absolute value circuit 138 is then supplied to the gate circuit 140 for the selection of only the signals in the vector detecting area. The selected signals are sequentially added to the tables corresponding to the same address of the pixels in each block of the accumulating adding circuit 142. The added result of the table is input to the table value comparing circuit 144 where the amount and direction of movement of the image position in a frame, namely the motion vector, can be obtained from the address of the minimum added result.

In short, the absolute value of the difference between the representative point Rij and the signals $Si+xj+y$ having the relationship of horizontal direction x, vertical direction y with the representative point Rij. Thereafter, accumulative adding table Dxy is obtained by performing an adding operation of the xy of the same positional relationship to each of the representative points. Then, Dxy will be expressed as follows:

$$Dxy = \Sigma_i \Sigma_j |Rij - Si_{xj}i_y|$$

The x and y of the minimum value is designated as a horizontal and vertical motion vector.

When the main object moves uniformly on the major part of the screen, the larger the number of blocks, the greater the detecting accuracy of the motion vector. However, if the main object moves only at a part of the screen, the detecting accuracy of the motion vector will be improved only from the adjacent frames of the main object (gate area) rather than from all the blocks.

Therefore, the movement of the main object can be accurately detected by adaptively changing the number of blocks to be accumlatively added in accordance with the contents of the image.

In this case, for example, it is possible to judge if the image occupies all or only a part of the screen from the distribution of the histogram of the signal level at the representative point. Specifically, it is calculated what percentage does the scope of averaged value ± of the signal level at the representative points of the focusing detecting area or the photometric area occupy of all the representative points. When the occupying rate is high, this means that the main object occupies the majority of the screen. Meanwhile when the occupying rate is low, this means that the main object occupies only a part of the screen. This is hereby defined as a judging device. It is assumed that the motion vector detecting area equals the focusing detecting area or the photometric area, that there are provided a block counter, area start register (hereinafter referred as "RSR"), and an area end register (hereinafter referred as "RER") in both the horizontal and vertical directions, and that the block counter designates the block over RSR and below RER as a detecting area.

When the detecting area is moved while maintaining its size on detecting the motion vector, the values of RSR and RER are simultaneously increased and decreased. When the detecting area is enlarged on judging the magnitude of the object, the RSR is decreased while the RER increased. When the detecting area is made small on judging the magnitude of the object, the RSR is increased while the RER decreased. This is defined as an area changing device.

These will now be described more specifically hereinafter. For instance, the histogram generating device 146 generates a density histogram of the signal level at the representative points, while the main object's magnitude judging device 148 judges the magnitude of the object from the distribution of the density histogram, thereby outputting a object magnitude signal F. Specifically, the histogram generating device 148 computes at what percentage of all the representative points are the scope of average ± of the signal level of the representative points at the focusing detecting area or the photometric area. The main object's magnitude judging device judges that the main object occupies the majority of the screen when the occupying rate is high, and that the main object occupies only a part of the screen when the occupying rate is low.

Figure 5:
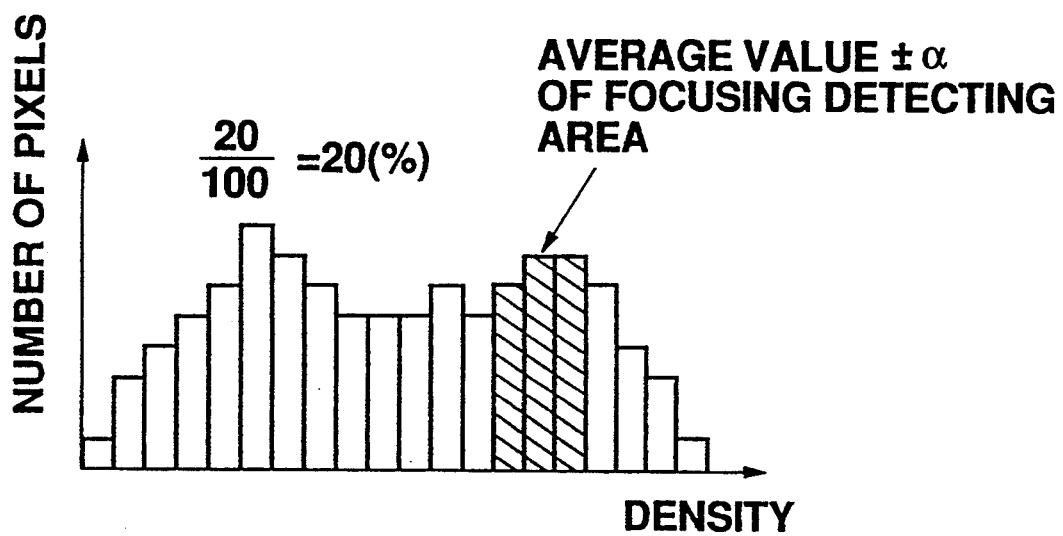
FIGS. 5-9 are views showing the features of the main object's magnitude judging device and the area changing device.
Figure 6:
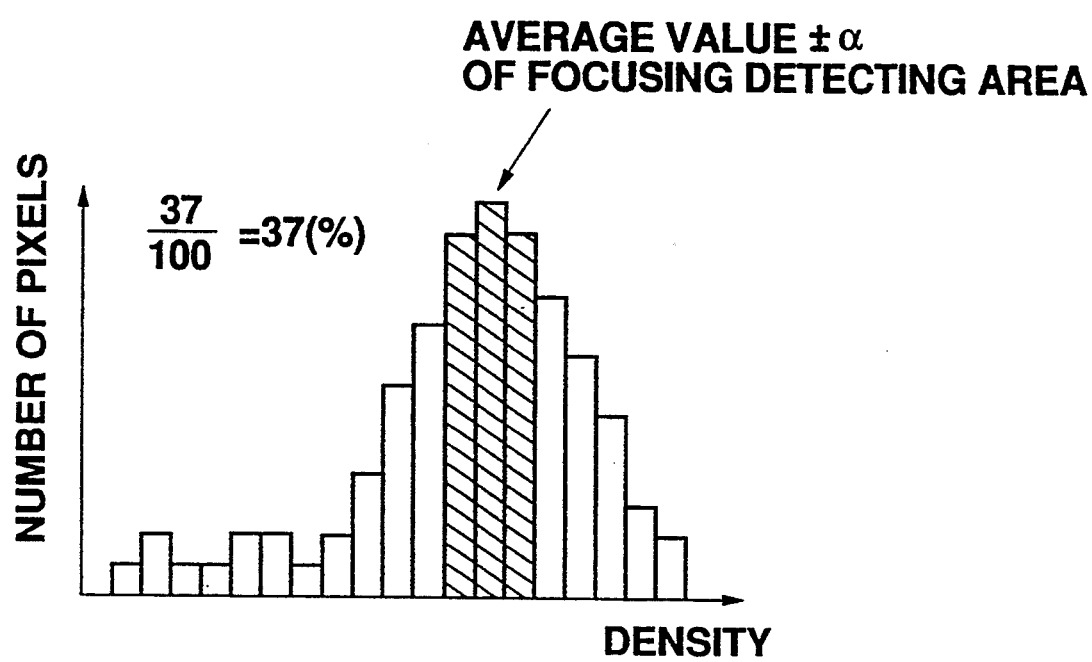

For example, when the density histogram of the signal level at the representative point is as shown in FIG. 5, namely when the average value of signal level at the representative points of the focusing detecting area or the photometric area occupies only 20% of all the representative points, it is judged that the main object occupies only a part of the screen. Meanwhile, when the average value of signal level at the representative points of the focusing detecting area or the photometric area occupies more than 37% of all the representative points, it is judged that the main object occupies the majority of the screen.

Next, it will be described how the focusing detecting area or the photometric area is to be generated in the gate area controlling circuit 78 or in the photometric area controlling circuit 110.

In the gate area controlling circuit 78 or in the photometric area controlling circuit 110, the block counter, the RSR and the RER are provided for both the horizontal and vertical directions. The block counter designates the block over RSR and below RER as a detecting area, and also designates the logical product of the horizontal detecting area with the vertical detecting area as a focusing detecting area or a photometric area.

Figure 7:
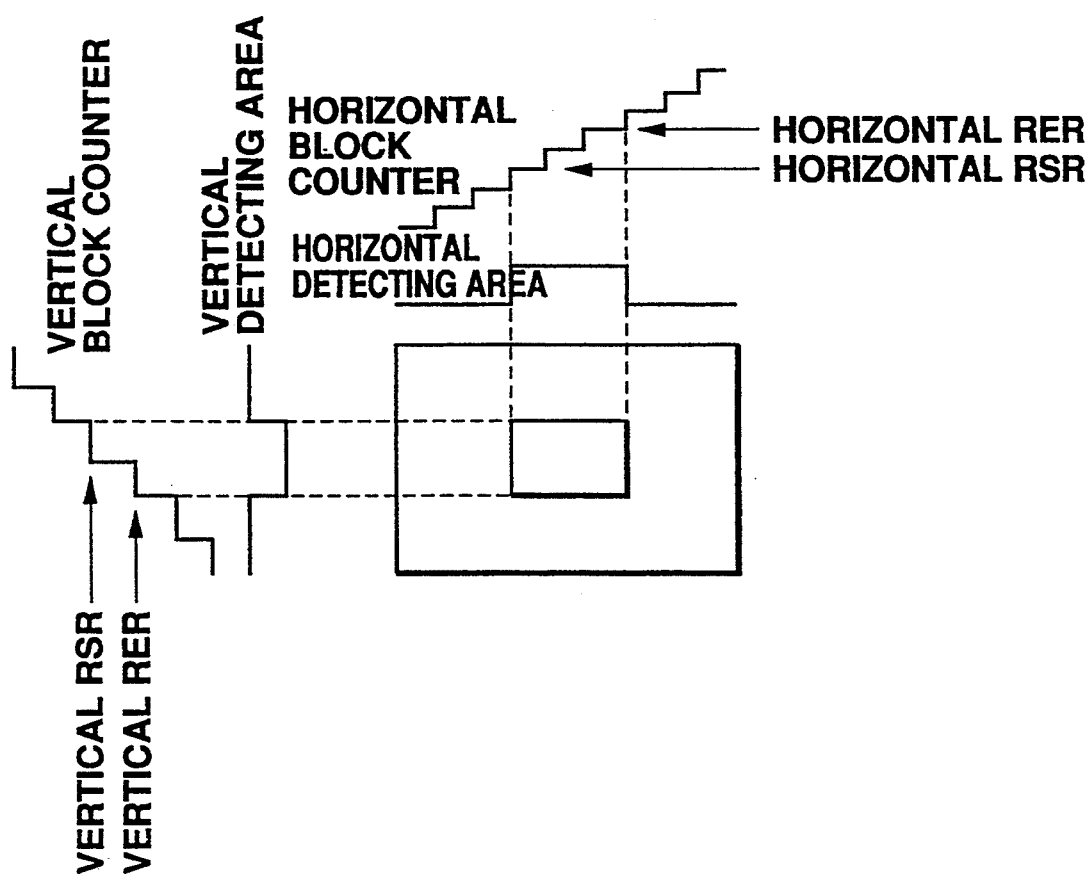
Figure 8:
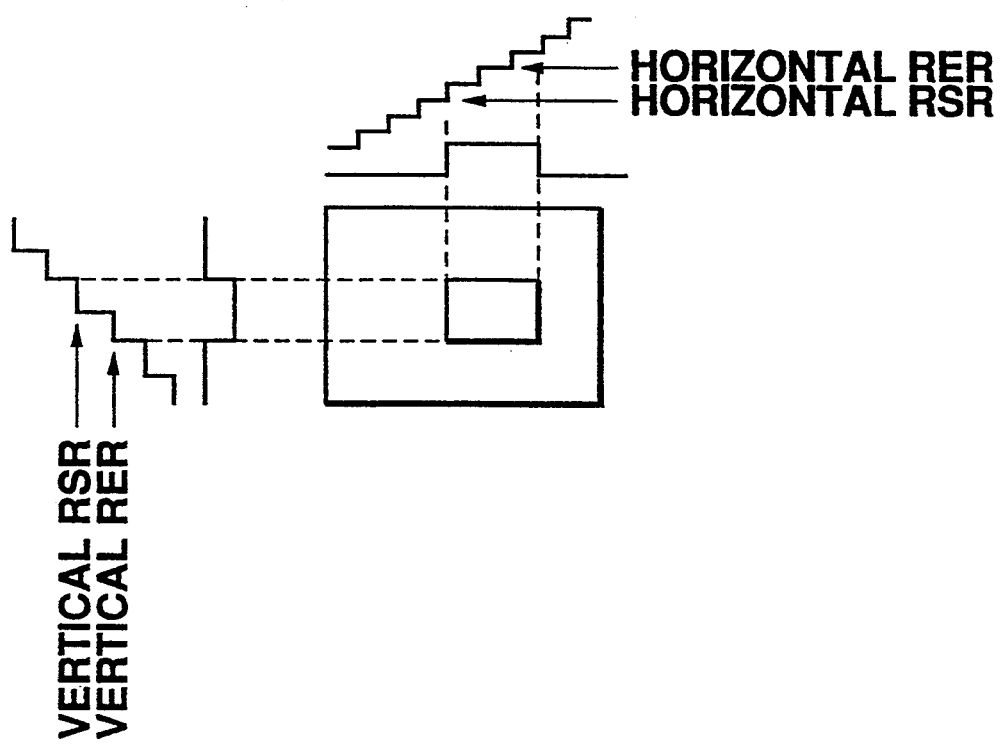

If the motion vector signal E, indicating that the object has moved in a right-hand direction, is input when the horizontal RSR, the horizontal RER, the vertical RSR, and the vertical RER are set as shown in FIG. 7 so as to generate a focusing detecting area or a photometric area. The focusing detecting area or the photometric area can be moved in accordance therewith by increasing the value of both the horizontal RSR and the horizontal RER simultaneously, as shown in FIG. 8. This is the function of the area changing device.

Figure 9:
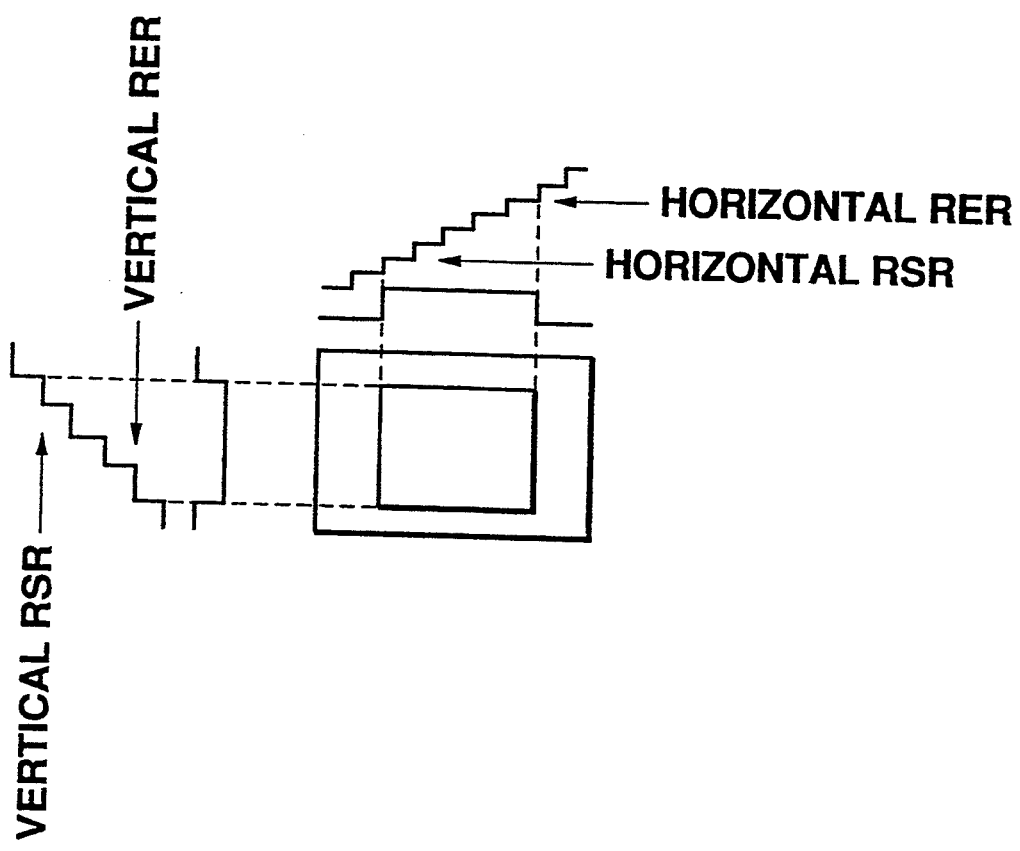

When an object magnitude signal F, indicating that the object occupies the majority of the screen, is input when the state of the photometric area is as shown in FIG. 7, the focusing detecting area or the photometric area can be enlarged by increasing the horizontal RER and the vertical RER as shown in FIG. 9.

Figure 10:
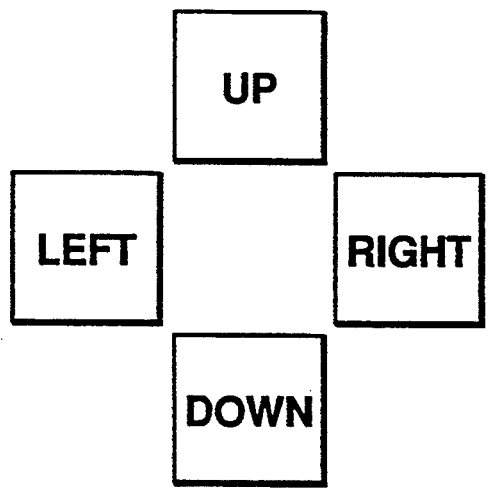
FIGS. 10(a)-10(d) are schematic views showing the structure and the operation of the pointing device.
Figure 10:
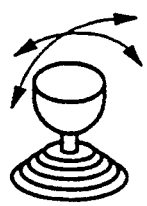
Figure 10:
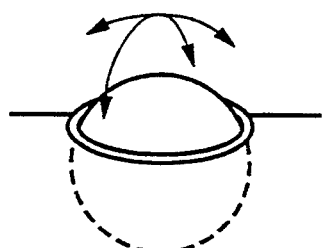
Figure 10:
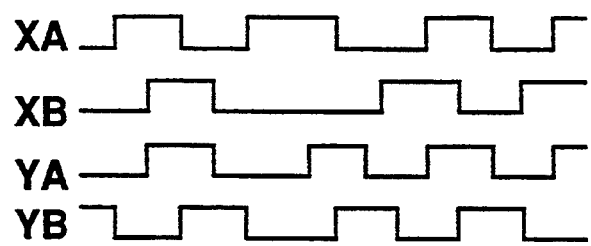
Figure 12:
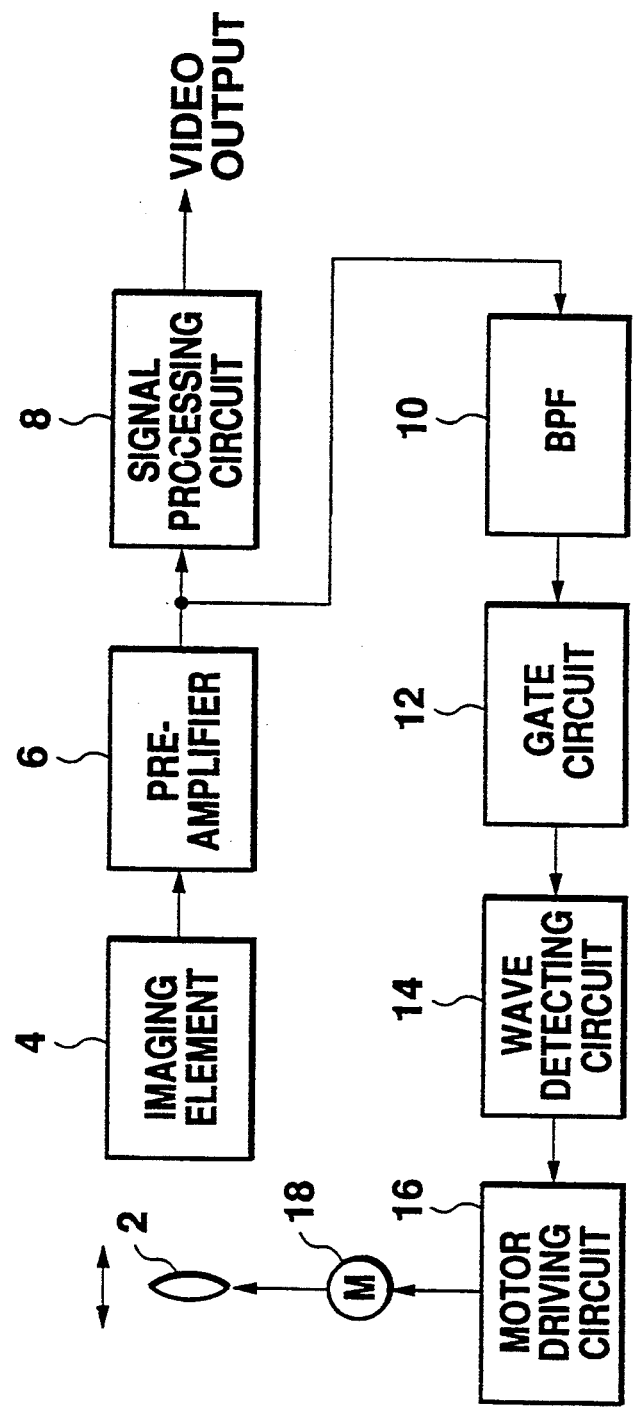
FIG. 12 is a block diagram showing a conventional automatic focusing device.
Figure 13:
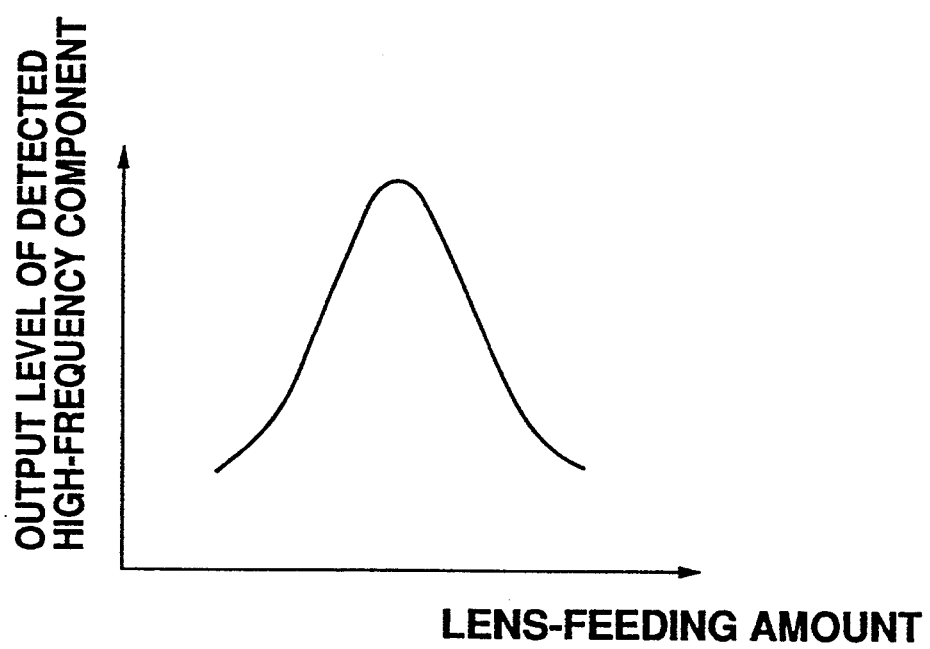
FIG. 13 is a graphic diagram showing the relationship between the detected high-frequency component level and the feeding amount of the lens.
Figure 14:
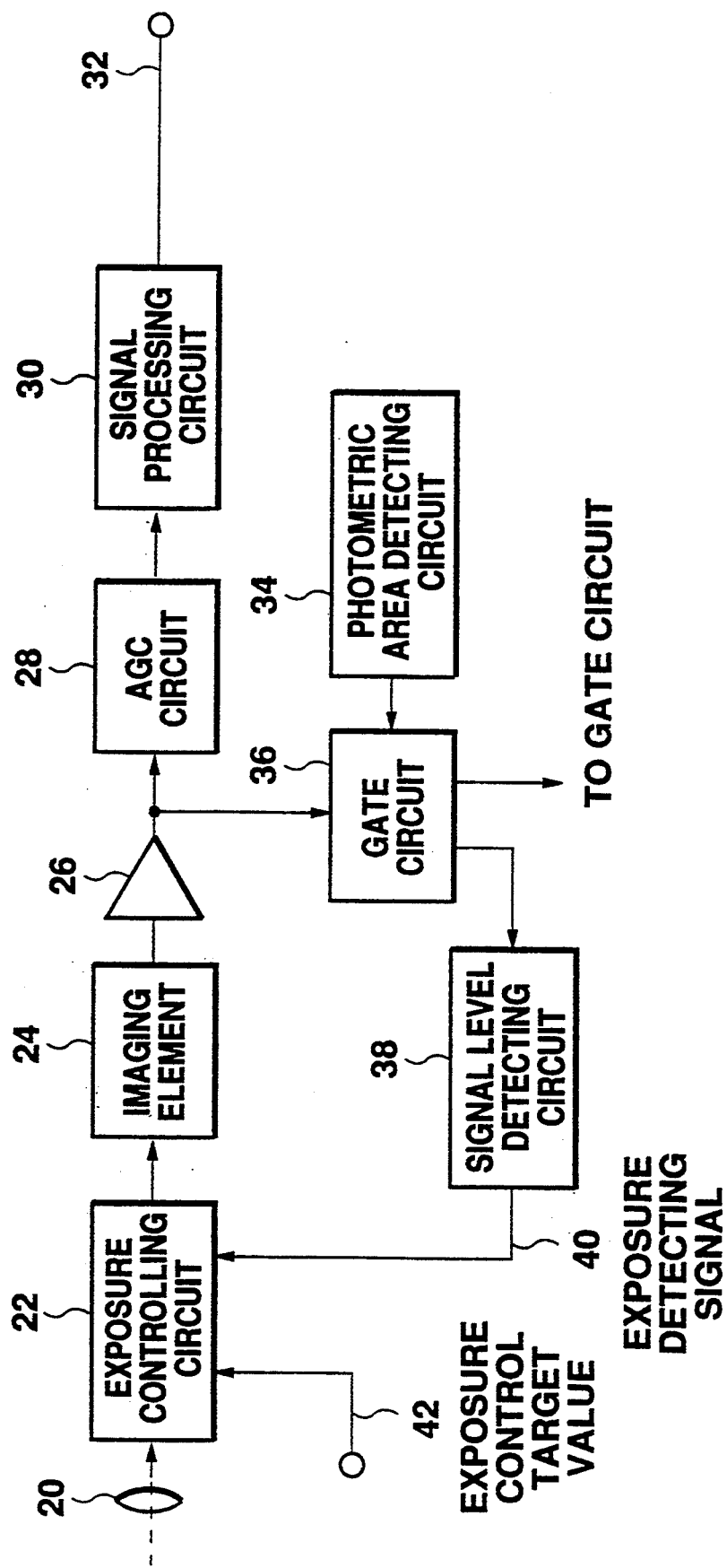
FIG. 14 is a block diagram showing a conventional exposure controlling device.
Figure 15A:
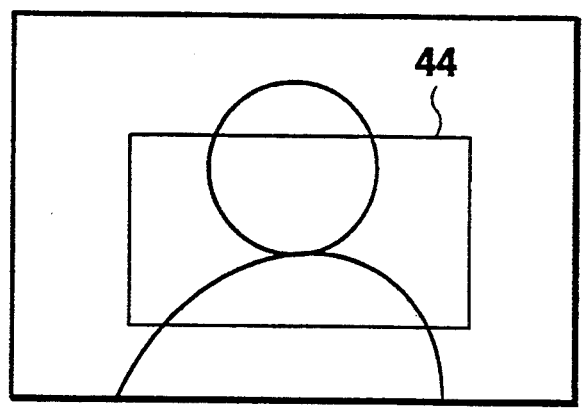
FIGS. 15A and 15B are schematic views showing a photometric frame for the screen frame and an example of a screen-dividing method in the emphasized photometric operation.
Figure 15B:
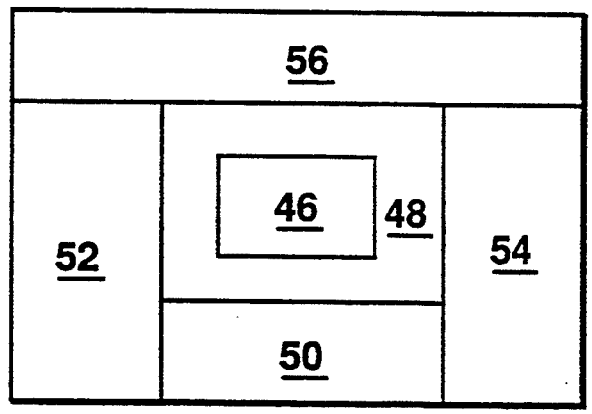

Next, the pointing device 76, 116 will be described referring to the FIG. 10. As a pointing device used in this embodiment, from the standpoint of handling, it is preferable to select such a pointing device that is capable of directly ordering movement in the direction of up, down, left, and right (x and y directions), e.g. a key switch in the four directions as shown in FIG. 10(a), a joy stick as shown in FIG. 10(b), or a roller ball as shown in FIG. 10(c). In general, a roller ball outputs two signals for a single axis (e.g. as shown in FIG. 10(d), XA, XB for the x axis and YA, YB for the y axis). The movement is dictated by the phase relationship of the two signals.

Now referring to FIG. 11, the gate area superimposing circuit or the photometric area superimposing circuit 72, 112 will now be described hereinafter. In FIG. 11(a), the gate area superimposing circuit or the photometric area superimposing circuit 72, 112 comprises a clamp circuit 72a, 112a, partial pressure variable resistance 72b, 112b, and a switching circuit 72c, 112c. At the portions G, H, I and J of this circuit, the waveforms as shown in FIG. 7(b) with the same codes would appear. The code I indicates a timing signal according to the photometric area output from the photometric area controlling circuit 110. In operation, the video signal clamped in the clamp circuit 72, 112 is switched to a predetermined DC level of H at a superimpose timing. The superimposed signal J will be tranmitted to a view finder etc. An example of an image to be displayed on the view finder is shown in FIG. 11(c) with the designation of K. This display area K can move in the up, down, left and right directions depending on the detected motion vector and the command supplied from the pointing device.

As mentioned above, according to this invention, since the gate area or the photometric area can be changed, the focusing or the exposure controlling operation can be carried out accurately following the motion of the main object irrespective of the positional change of the object in the screen. Further, the gate area or the photometric area can be designated easily by the gate area or the photometric area designating device, the user can visually recognize the gate or the photometric area by the gate area or the photometric area superimposing device, and furthermore the motion of the main object can be accurately detected by the area changing device.

What is claimed is:

1. An exposure controlling apparatus for controlling exposure in an optical system based on an image signal obtained at a photometric area designated on a photographic screen, said apparatus comprising:
   (a) motion vector detecting means for detecting the motion of an image in a motion vector detecting area from the correlation of two time continuous frames of image data;
   (b) photometric area controlling means for detecting the motion of a main object from the output of said motion vector detecting means, and for controlling this photometric area to follow the motion of the main object;
   (c) judging means for judging if the main object occupies a part or the majority of the screen;
   (d) area changing means, responsive to said judging means, for changing the motion vector detecting area and the photometric area.

2. The exposure controlling apparatus of claim 1, further comprising:
   (e) photometric superimposing means for superimposing a moveable photometric area on the image signal and displaying the superimposed signal; and
   (f) photometric designating means for allowing manual shifting of the moveable photometric area by a user.

3. The exposure controlling apparatus of claim 2, wherein the photometric designating means is a rollerball.

4. The exposure controlling apparatus of claim 2, wherein the photometric designating means is a joystick.

5. The exposure controlling apparatus of claim 2, wherein the photometric area designating means includes a plurality of directional key switches.

6. The exposure controlling apparatus of claim 2, wherein the photometric area designating means is a rollerball.

7. The exposure controlling apparatus of claim 2, wherein the photometric area designating means is a joystick.

8. The exposure controlling apparatus of claim 1, further comprising:
   (e) means for controlling exposure based on light intensity information in the photometric area.

9. An exposure controlling apparatus for controlling exposure in an optical system based on an image signal obtained at a photometric area designated on a photographic screen, said apparatus comprising:
   (a) motion vector detecting means for detecting the motion of an image from the correlation of two time continuous frames of image data; and
   (b) photometric area controlling means for detecting the motion of a main object from the output of said motion vector detecting means, and for moving the photometric area to follow the motion of the main object.

10. The exposure controlling apparatus of claim 9, further comprising:
   (c) means for controlling exposure based on light intensity information in the photometric area.

11. An exposure controlling apparatus for controlling exposure in an optical system based on an image signal obtained at a photometric area designated on a photographic screen, said apparatus comprising:
   (a) motion vector detecting means for detecting the motion of an image from the correlation of two time continuous frames of image data;
   (b) photometric area controlling means for detecting the motion of a main object from the output of said motion vector detecting means, and for moving the photometric area to follow the motion of the main object; and
   (c) photometric area designating means for designating the photometric area in accordance with the main object to be followed.

12. An exposure controlling apparatus for controlling exposure in an optical system based on an image signal obtained at a photometric area designated on a photographic screen, said apparatus comprising:
   (a) motion vector detecting means for detecting the motion of an image from the correlation of two time continuous frames of image data;
   (b) photometric area controlling means for detecting the motion of a main object from the output of said motion vector detecting means, and for moving the photometric area to follow the motion of the main object; and
   (c) photometric area superimposing means for superimposing the photometric area on the image signal, and displaying the superimposed signal.

13. An exposure controlling apparatus for automatically controlling exposure in an optical system on the basis of image signals obtained in a photometric area designated on a photographic screen, said apparatus comprising:
   (a) motion vector detecting means for detecting motion of an image by correlating pixel density values of two time continuous frames of image data and accumulatively adding the correlated pixel density values to create a motion vector; and (b) photometric area controlling means for detecting the motion of a main object from the motion vector and for controlling the movement of the photometric area to follow the detected motion of the main object.

14. The exposure controlling of claim 13, further comprising:

(c) photometric area designating means for designating the photometric area in accordance with the main object to be followed.

15. The exposure controlling apparatus of claim 13, further comprising:

(c) photometric superimposing means for superimposing the photometric area on the image signal, and displaying the superimposed signal; and (d) photometric area designating means for allowing manual shifting of the photometric area by a user.

16. The exposure controlling apparatus of claim 13, further comprising:

(c) judging means for judging the main object as occupying one of a part and a majority of the screen; and (d) area changing means for varying the area in which the motion vector is detected in accordance with contents of the image so as to detect the motion vector from the image of the entire screen when the main object is judged to occupy the majority of the screen, and from only a portion of the image in a vicinity of the parametric area when the main object is judged to occupy only a part of the screen less than a majority.

17. The exposure controlling apparatus of claim 15, wherein the photometric designating means includes a plurality of directional key switches.

18. The exposure controlling apparatus of claim 15, wherein the photometric designating means is a rollerball.

19. The exposure controlling apparatus of claim 15, wherein the photometric designating means is a joystick.

20. The exposure controlling apparatus of claim 16, further comprising:

(e) photometric superimposing means for superimposing a moveable photometric area on the image signal and displaying the superimposed signal; and (f) photometric designating means for allowing manual shifting of the moveable photometric area by a user.

21. The exposure controlling apparatus of claim 20, wherein the photometric designating means includes a plurality of directional key switches.

22. The exposure controlling apparatus of claim 20, wherein the photometric designating means is a rollerball.

23. The exposure controlling apparatus of claim 20, wherein the photometric designating means is a joystick.

24. The exposure controlling apparatus of claim 14, wherein the photometric area designating means includes a plurality of directional key switches.

25. The exposure controlling apparatus of claim 14, wherein the photometric area designating means is a rollerball.

26. The exposure controlling apparatus of claim 14, wherein said photometric area designating means is a joystick.

27. The exposure controlling apparatus of claim 13, further comprising:

(c) means for controlling exposure based on light intensity information in the photometric area.

28. The exposure controlling apparatus of claim 15, further comprising:

(e) means for controlling exposure based on light intensity information in the photometric area.

29. The exposure controlling apparatus of claim 16, further comprising:

(e) means for controlling exposure based on light intensity information in the photometric area.

30. The exposure controlling apparatus of claim 25, wherein the photometric designating means includes a plurality of directional key switches.

31. In a photographic instrument, a method for controlling exposure of an image, comprising:

(a) measuring light intensity of each of a plurality of image areas selected from said image;

(b) determining an average value of light intensity of the measured light intensities of a sub-group of image areas selected from said plurality of image areas;

(c) determining the percentage of image areas of said plurality of image areas which fall within a continuous range of light intensities, said range including said average value;

(d) controlling exposure in said photographic instrument in response to the determined percentage.

32. The method for controlling exposure of claim 31, wherein step (a) measures the light intensity of image areas evenly distributed across the entire image.

33. The method for controlling exposure of claim 31 wherein step (b) determines the average value of light intensity of a sub-group of image areas bound within a single changeable area on the image.

34. The method for controlling exposure of claim 33 further comprising:

(e) changing the single changeable area in response to an object detected on said photographic screen.

35. The method for controlling exposure of claim 34 wherein step (e) changes the single changeable area to follow and include at least part of said object.

36. The method for controlling exposure of claim 31 wherein step (c) determines a percentage of image areas of said plurality of image ares which equal said average value of light intensity plus or minus a second value.

37. The method for controlling exposure of claim 31 wherein said step (d) controls exposure as a function of the light intensities of each of the plurality of image areas or as a function of each of the light intensities of the image areas of said sub-group of image areas in response to the determined percentage.

38. The method for controlling exposure of claim 31 wherein step (d) includes:

(d1) controlling exposure as a function of light intensities of said plurality of image areas evenly distributed across the entire image when said percentage determined in step (c) is greater than a predetermined threshold; and (d2) controlling exposure as a function of light intensities of said sub-group of image areas when said percentage determined in step (c) is less than said predetermined threshold.

39. The method for controlling exposure of claim 31 wherein said step (a) measures light intensities of each of a plurality of pixels selected from said image.

* * * * *

UNITED STATES PATENT AND TRADEMARK OFFICE
CERTIFICATE OF CORRECTION

PATENT NO. : 5,349,415
DATED : September 20, 1994
INVENTOR(S) : Yoshihiro NISHIDA It is certified that error appears in the above-indentified patent and that said Letters Patent is hereby corrected as shown below:

COLUMN 7, LINE 23:

Please change

"$D_{xy} = \Sigma_i \Sigma_j |R_{ij} - S_{i+x j+y}|$"

to

--$D_{xy} = \Sigma_i \Sigma_j |R_{ij} - S_{i+x j+y}|$--

Signed and Sealed this

Seventeenth Day of January, 1995

Attest:

BRUCE LEHMAN

Attesting Officer     Commissioner of Patents and Trademarks